(12) United States Patent
Takahara

(10) Patent No.: US 6,428,086 B2
(45) Date of Patent: Aug. 6, 2002

(54) ENERGY ABSORBER SECURING STRUCTURE AND METHOD

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/836,230

(22) Filed: Apr. 18, 2001

Related U.S. Application Data

(62) Division of application No. 09/298,865, filed on Apr. 26, 1999.

(30) Foreign Application Priority Data

Jul. 31, 1998 (JP) .......................... 10-217387
Aug. 18, 1998 (JP) .......................... 10-231804

(51) Int. Cl.[7] .................. B60R 21/02; B60R 21/04; B60R 21/055; B60R 27/00
(52) U.S. Cl. ............. 296/189; 296/188; 296/203.02; 296/203; 280/748; 280/751
(58) Field of Search ............... 296/188, 189, 296/146.6, 203.02, 203.03; 293/151, 152, 153; 280/748, 751

(56) References Cited

U.S. PATENT DOCUMENTS

| | | | |
|---|---|---|---|
| 1,807,640 A | 6/1931 | Thomas | 293/122 |
| 3,655,237 A | 4/1972 | Pitman | 296/188 |
| 3,904,223 A | 9/1975 | Wilfert et al. | |
| 3,944,276 A | 3/1976 | De Rosa et al. | 296/188 |
| 4,217,970 A | 8/1980 | Chika | 296/188 |
| 4,451,077 A | 5/1984 | Bruhnke et al. | 296/188 |
| 4,626,011 A | 12/1986 | Gauthier | 293/122 |
| 4,993,765 A | 2/1991 | Ryan | 293/151 |
| 5,085,485 A | 2/1992 | Wurl | 296/188 |
| 5,092,649 A | 3/1992 | Wurl | 296/185 |
| 5,094,504 A | 3/1992 | Wurl | 296/185 |
| 5,112,102 A | 5/1992 | Wurl | 296/204 |
| 5,114,198 A | 5/1992 | Yamashita et al. | 293/120 |
| 5,163,730 A | 11/1992 | Welch | |
| 5,273,330 A | 12/1993 | Petry et al. | 293/132 |
| 5,380,042 A | 1/1995 | Hively et al. | 296/188 |
| 5,397,115 A | 3/1995 | Vlahovic | 296/29 |
| 5,466,035 A | 11/1995 | Klages et al. | 296/188 |
| 5,660,426 A | 8/1997 | Sugimori et al. | |
| 5,680,886 A | 10/1997 | Ohtsuka | |
| 5,681,057 A | 10/1997 | Whirley et al. | 296/188 |
| 5,727,826 A | 3/1998 | Frank et al. | 296/146.6 |
| 5,762,392 A | 6/1998 | Suga | |
| 5,857,702 A | 1/1999 | Suga et al. | 296/189 |
| 6,050,624 A | 4/2000 | Kim | 293/132 |
| 6,059,331 A | 5/2000 | Mori | 296/189 |
| 6,079,732 A * | 6/2000 | Nakajima et al. | 280/728.2 |
| 2002/0033617 A1 * | 3/2002 | Blank | 296/187 |

FOREIGN PATENT DOCUMENTS

| | | | |
|---|---|---|---|
| JP | A-7-61304 | | 3/1995 |
| JP | A-8-119047 | | 5/1996 |
| JP | A-9-99863 | | 4/1997 |
| JP | 2001-191947 | * | 7/2001 |

OTHER PUBLICATIONS

U.S. patent application No. 09/069,734 filed Apr. 30, 1998.

* cited by examiner

*Primary Examiner*—Stephen T. Gordon
*Assistant Examiner*—H. Gutman
(74) *Attorney, Agent, or Firm*—Oliff & Berridge, PLC

(57) ABSTRACT

A structure for securing a hollow energy absorber to a vehicle body structural member includes a joint member. The joint member has two fitting end portions fittable to an end portion of one of two adjacent energy absorbers and an end portion of the other energy absorber, respectively, the end portions facing each other. The joint member is mountable to a structural member.

3 Claims, 16 Drawing Sheets

ENERGY ABSORBER SECURING STRUCTURE AND METHOD

This is a Division of Application Ser. No. 09/298,865 filed Apr. 26, 1999. The entire disclosure of the prior application is hereby incorporated by reference herein in its entirety.

INCORPORATION BY REFERENCE

The disclosures of Japanese Patent Application Nos. HEI 10-231804 filed on Aug. 18, 1998, and HEI 10-217387 filed on Jul. 31, 1998, each including the specification, drawings and abstract, are incorporated herein by reference in their entirety.

BACKGROUND OF THE INVENTION

1. Field of Invention

The present invention relates to a securing structure, and method for securing, an energy absorber which is disposed on a compartment side of a structural member of a vehicle body, such as a pillar, a roof side rail, a header and the like, and which is covered with an interior trim material, such as a pillar garnish, a roof lining and the like. The energy absorber absorbs an impact energy transmitted thereto via the interior trim material.

2. Description of Related Art

In motor vehicles, particularly, in passenger cars, an energy absorber is disposed in a space between an interior trim member and a structural member of a vehicle body. Therefore, if an impact load is applied in a direction from the interior trim member to the structural member, the energy absorber deforms to absorb energy of the impact load. Normally employed energy absorbers are, for example, a grid rib member, a urethane pad, a steel member formed by bending a thin steel sheet so as to have a hat-like sectional shape, and the like. Also employed as an energy absorber is a generally-termed hybrid pipe (as described in U.S. Pat. No. 5,680,886) that is formed of a metal foil core member and sheets of a material other than metal that are laid on opposite side surfaces of the core member. In the hybrid pipe, the core member and the sheets on the opposite side surfaces of the core member are corrugated so that ridges and grooves alternate in a direction of an axis of the pipe.

A hybrid pipe, after being formed, can easily be changed into a desired sectional shape hybrid pipe can be adjusted by changing a dimension of the hybrid pipe measured between an outermost point in the curved outer surface of a ridge or protruded portion and an innermost point in the curved inner surface of a groove or recessed portion, that is the generally-termed apparent plate thickness of the hybrid pipe, or changing the pitch between adjacent protruded portions (recessed portions), and the like. Thus, a hollow-shaped energy absorber represented by a hybrid pipe or the like has properties desirable for an energy absorber.

Vehicle body structural members to be installed at certain locations in a vehicle body are formed into three-dimensionally bent shapes in order to meet strength requirements and design needs. To conform to the three-dimensionally bent shape of a structural member, a substantially straight-formed energy absorber is subjected to a bending process. Normally, the energy absorber bending process is time-consuming and disadvantageous in cost. Therefore, in some cases, a plurality of energy absorbers of the same sectional shape or dimensions are screwed, at opposite ends of each absorber, to a structural member, so that the energy absorbers function as a single unit.

In some other cases, the interval between a structural member and an interior trim material disposed at a compartment-side of the structural member, which interval is necessary to absorb a predetermined amount of energy, varies in the direction of a length of the structural member. In such a case, a plurality of energy absorbers of different sectional shapes or dimensions are screwed at opposite ends of each absorber to the structural member, so that the energy absorbers function as a single unit.

The aforementioned operation of securing a plurality of energy absorbers individually to a structural member is time and labor-consuming.

SUMMARY OF THE INVENTION

Accordingly, it is an object of the present invention to provide a securing structure that makes effective use of the properties of a hollow-shaped energy absorber, such as a hybrid pipe, and facilitates the securing of the energy absorber to a structural member.

According to an aspect of the invention, there is provided a securing structure including a plurality of hollow energy absorbers, and a joint member having fitting end portions which are fittable to end portions of at least two adjacent energy absorbers of the plurality of hollow energy absorbers, the end portions of the at least two adjacent energy absorbers facing each other, and the joint member being mountable to a vehicle body structural member.

In this securing structure, one of two fitting end portions of the joint member is fitted to an end portion of a first energy absorber of the at least two adjacent energy absorbers, the end portion of the first energy absorber facing a second energy absorber. The other one of the two fitting end portions of the joint member is fitted to an end portion of the second energy absorber, the end portion of the second energy absorber facing the end portion of the first energy absorber. By subsequently mounting the joint member, the energy absorbers are secured to the structural member so that the energy absorbers are ready for use.

The securing structure makes it possible to couple two adjacent energy absorbers by fitting an end of each energy absorber to a fitting end portion of the joint member and to secure the two energy absorbers coupled by the joint member to a structure member by mounting the joint member to the structural member. Therefore, the above-described securing structure eliminates the need to perform a so-called post-process on an energy absorber, for example, forming a securing hole, applying an adhesive, and the like, and enables easy and quick mounting of a plurality of energy absorbers to a structural member, thereby considerably improving the operability of the securing process.

The length of each fitting end portion of the joint member can be arbitrarily selected so as to prevent an energy absorber fitted to the joint member from slipping off from the fitting end portion of the joint member if the energy absorber is deformed by an impact load. Thus, a plurality of energy absorbers can be kept secured to the structural member even at the time of an impact. Therefore, if an energy absorber receives an impact load and another energy absorber subsequently receives an impact load, a sufficiently high energy absorbing function can be performed.

The facing end portions of the at least two adjacent energy absorbers may have cross sections that differ in at least one of size and shape, and each fitting end portion of the joint member may have a sectional shape substantially geometrically similar to a sectional shape of the end portion of an energy absorber to which the fitting end portion is to be fitted.

If the sectional shape of each fitting end portion of the joint member is substantially geometrically similar to the sectional shape of the corresponding energy absorber end portion as described above, the fitting end portions of the joint member can easily be fitted to the corresponding energy absorber end portions. Therefore, if energy absorbers that are to be disposed adjacent to each other and a joint member having fitting end portions each of which has a sectional shape substantially geometrically similar to the sectional shape of the corresponding energy absorber end portion are prepared beforehand, the energy absorbers can easily be coupled with high precision. Consequently, it becomes possible to provide a sequence of a plurality of energy absorbers coupled lengthwise wherein an energy absorber disposed at one site is different in sectional shape or size from an energy absorber disposed at another site.

In the above-described securing structure, the joint member may be formed by a structural body capable of absorbing an impact energy.

If the joint member itself is capable of absorbing impact energy as described above, even an impact load applied to the coupling portion between adjacent energy absorbers can be absorbed by deformation of the energy absorbers and the joint member therebetween. Therefore, a highly-efficient energy absorbing structure with continuity can be provided.

This structural body capable of absorbing impact energy may be hollow and may have a securing device provided in a surface that faces the structural member.

In this construction, since the joint member is hollow, it becomes possible to pass a wire harness, a duct or other accessories through the inner space of the joint member and the energy absorbers. Thus, the joint member and the energy absorbers also serve the protector function for the accessories extending therethrough. Furthermore, since the joint member is capable of absorbing impact energy, a highly-efficient energy absorbing structure with continuity can be provided Further, the joint member can easily be mounted to a structural member by using the securing device provided in the structure body of the joint member.

In the hollow energy absorber securing structure according to the first aspect of the invention, the energy absorbers may include at least one hybrid pipe having a metal foil core and sheets laid on opposite surfaces of the core, each sheet being formed from a material other than metal. The hybrid pipe is formed by continually corrugating the core having the sheets on the opposite surfaces of the core in a direction of an axis of the hybrid pipe. The hybrid pipe and the joint member may be fitted to each other for a sliding movement in a direction of the axis.

Due to its property, the hybrid pipe elongates in directions of its axis while undergoing compression deformation, if the hybrid pipe receives an impact load in a direction intersecting the axis. In the above-described construction, the hybrid pipe and the joint member are fitted to each other in such a manner that they can slide in the directions of the axis. Therefore, if a hybrid pipe receives an impact load in a direction intersecting its axis and undergoes compression deformation, the elongation of the hybrid pipe in the directions of the axis is absorbed by a sliding movement relative to the joint member, so that another hybrid pipe adjacent to the joint member is not affected. As a result, if an impact load is subsequently applied to a different site, the hybrid pipe at that site performs the designed function to absorb impact energy.

The energy absorbers may include at least one metal pipe. The metal pipe and the joint member may be fitted to each other for a sliding movement in a direction of an axis of the metal pipe.

Due to its property, the metal pipe undergoes compression deformation and, simultaneously, bending deformation, if the metal pipe receives an impact load in a direction intersecting its axis. In the above-described construction, the metal pipe and the joint member are fitted to each other in such a manner that they can slide in the directions of the axis. Therefore, if a metal pipe receives an impact load in a direction intersecting its axis and undergoes compression deformation, the bending deformation of the metal pipe is absorbed by a sliding movement relative to the joint member, so that another metal pipe adjacent to the joint member is not affected. As a result, if an impact load is subsequently applied to a different site, the metal pipe at that site performs the designed function to absorb impact energy.

According to another aspect of the invention, there is provided a hollow energy absorber securing structure including a plurality of hollow energy absorbers, wherein at least two adjacent energy absorbers are connected by fitting an end portion of a first energy absorber of the at least two energy absorbers to an end portion of a second energy absorber of the at least two energy absorbers, the end portion of the first energy absorber and the end portion of the second energy absorber facing each other, and wherein at least one of the adjacent energy absorbers is mountable to a vehicle body structural member.

In this hollow energy absorber securing structure, at least two adjacent energy absorbers are connected to each other by fitting an end portion of one of the at least two energy absorbers to an end portion of another one of the energy absorbers, the end portions facing each other. Therefore, this securing structure does not need a joint member, so that the number of component parts required can be reduced and a simplified securing structure can be provided. Furthermore, the energy absorbing characeristics of the end portions can be adjusted by changing the fitting length of the end portions facing each other.

In the hollow energy absorber securing structure described above, the at least two adjacent energy absorbers, except the end portions to be fitted, may have cross sections that differ in at least one of size and shape, and the end portion of the first energy absorber may be expanded or contracted so that the end portion of the first energy absorber has a sectional shape substantially geometrically similar to a sectional shape of the end portion of the second energy absorber.

Through this minor post-process on an energy absorber that has been formed so as to have a consistent sectional shape, the energy absorber can easily be coupled to another energy absorber.

According to still another aspect of the invention, there is provided a hollow energy absorber securing structure including a hollow energy absorber, and a resin-made member capable of absorbing an impact energy, wherein the resin-made member has an extended portion that is protruded from an end of the resin-made member and that is fittable to an end portion of the energy absorber. An end portion of the resin-made member is coupled to the energy absorber by fitting the extended portion to an end portion of the energy absorber mounted to a vehicle body structural member, so that the resin-made member is secured to the structural member.

In this hollow energy absorber securing structure, the resin-made member is coupled to the energy absorber by fitting the extended portion protruded from the end surface of the resin-made member to the end portion of the energy absorber, before or after the energy absorber is mounted to the structural member. Therefore, the end portion of the resin-made member is coupled to the energy absorber, whereby the resin-made member is secured to the structural member.

By fitting the extended portion of the resin-made member to the end portion of the energy absorber, the end portion of the resin-made member can be coupled to the energy absorber and secured to the structural member. Therefore, it becomes unnecessary to use a tapping screw or other securing device for securing an end portion of the resin-made member to the energy absorber or the structural member. Furthermore, since the resin-made member becomes tentatively secured when the end portion of the resin-made member is connected to the energy absorber, it becomes easy to position the resin-made member to the structural member. Thus, the operability after the coupling of the resin-made member and the energy absorber improves.

At the time of an impact load from diagonally downward, the resin-made member tends to globally bend upwards, and the rising of reaction load tends to delay until the bending deformation ends. In the invention, however, the extended portion of the resin-made member is fitted to and therefore restricted by the end portion of the energy absorber, so that the bending deformation of the resin-made member is reduced. Therefore, when an impact load is applied to the resin-made member, the reaction load immediately rises, so that a predetermined load-displacement energy absorbing characteristic can be achieved.

According to a further aspect of the invention, there is provided a hollow energy absorber securing structure including a hollow energy absorber and a resin-made member capable of absorbing an impact energy, wherein the energy absorber and the resin-made member form a sub-assembly by fitting an extended portion which is protruded from an end surface of the resin-made member that faces the energy absorber and which is fittable to an end portion of the energy absorber, to the end portion of the energy absorber, and by tentatively connecting the extended portion and the end portion to each other by a fixing device, and the sub-assembly is secured to the structural member.

In this hollow energy absorber securing structure, the sub-assembly of the resin-made member and the energy absorber formed by fitting the extended portion of the resin-made member to the end portion of the energy absorber, and tentatively connecting the extended portion and the end portion to each other through the use of the fixing device is secured to the vehicle body structural member. Therefore, the handling of the resin-made member and the energy absorber becomes easy, and the securing thereof to the structural member is further facilitated, in comparison with a hollow energy absorber securing structure according to a different aspect of the invention wherein an extended portion of a resin-made member is coupled to an end portion of an energy absorber, and the energy absorber is secured to a structural member.

The aforementioned sub-assembly may be secured to the structural member by fastening a fastening device that extends through the end portion of the energy absorber and the extended portion of the resin-made member, to the structural member.

Since it becomes possible to fasten the resin-made member and the energy absorber to the vehicle body structural member by so-called joint fastening, the securing operation is facilitated. Furthermore, since the extended portion of the resin-made member is fitted to the end portion of the energy absorber, and then secured thereto by the fastening device, the resin-made member and the energy absorber can be firmly secured. Therefore, the bending of the resin-made member can be more effectively reduced.

The extended portion of the resin-made member may have a rib capable of absorbing an impact energy.

Provision of the energy absorption-capable rib in the extended portion of the resin-made member makes it possible to absorb impact energy that is applied to any site in the energy absorber, the resin-made member, and the coupling portion between the resin-made member and the energy absorber. Therefore, an efficient energy absorbing structure with continuity can be provided.

The structural member may include a front pillar and a roof side rail, and the energy absorber may be disposed at an intersecting portion between the front pillar and the roof side rail, and the resin-made member may be disposed at the roof side rail.

The energy absorber may be formed by one of a metal pipe and a hybrid pipe having a metal foil core and sheets laid on opposite surfaces of the core, each sheet being formed from a material other than metal, and the hybrid pipe being formed by continually corrugating the core and the sheets on the opposite surfaces of the core together in a direction of an axis of the hybrid pipe.

The interval between the intersecting portion between the front pillar and the roof side rail and an interior trim material is smaller than the interval between the pillar and a pillar garnish or the interval between the roof side rail and a roof lining. At the intersecting portion, therefore, a load-displacement energy absorbing characteristic with sharp reaction load rising and small displacement is required. This requirement is met by the hollow energy absorber formed by a hybrid pipe or a metal pipe, since either pipe has a characteristic with sharp reaction load rising According to a further aspect of the invention, there is provided an energy absorber including an elongated member, wherein a sectional shape of an end portion of the elongated member taken on a plane perpendicular to an axis of the elongated member is different from a sectional shape of a portion of the elongated member apart from the end portion thereof taken on a plane perpendicular to the axis, and wherein the elongated member is connectable to a vehicle body structural member.

According to a still further aspect of the invention, there is provided an energy absorbing structural body including a hollow energy absorber and a resin-made member capable of absorbing an impact energy, wherein the energy absorber and the resin-made member form a sub-assembly by fitting an extended portion which is protruded from an end surface of the resin-made member that faces the energy absorber and which is fittable to an end portion of the energy absorber, to the end portion of the energy absorber, and by connecting the extended portion and the end portion to each other by tentative fixing means.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
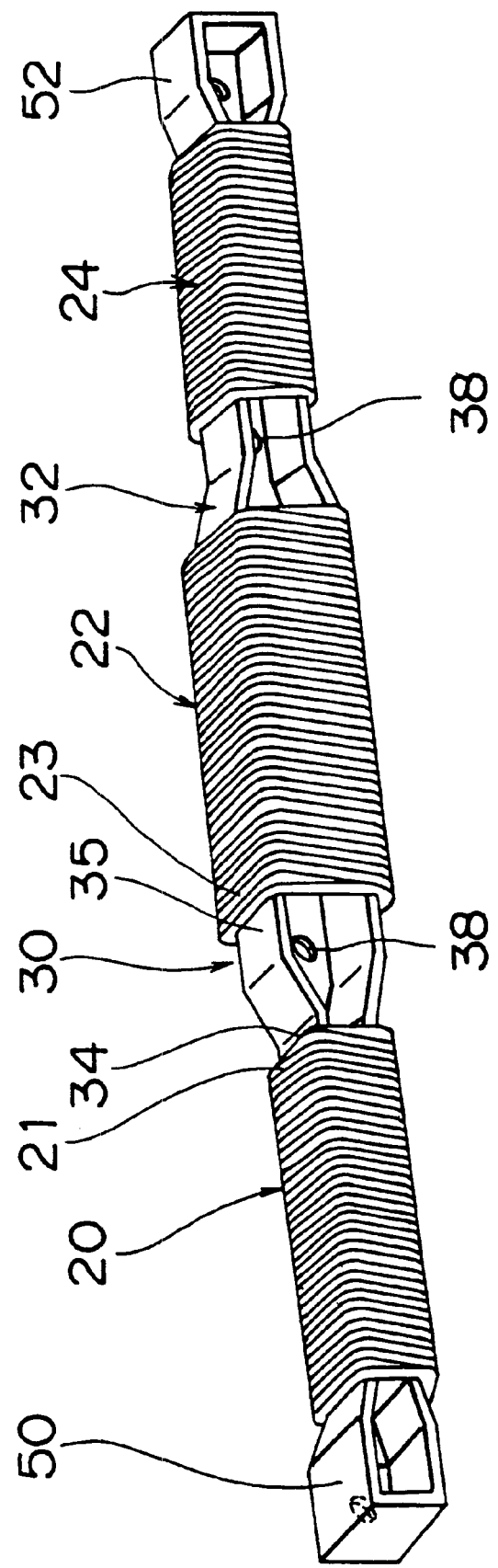
FIG. 1 is a perspective view of a first embodiment of the securing structure for a hollow energy absorber of the invention.
Figure 3:
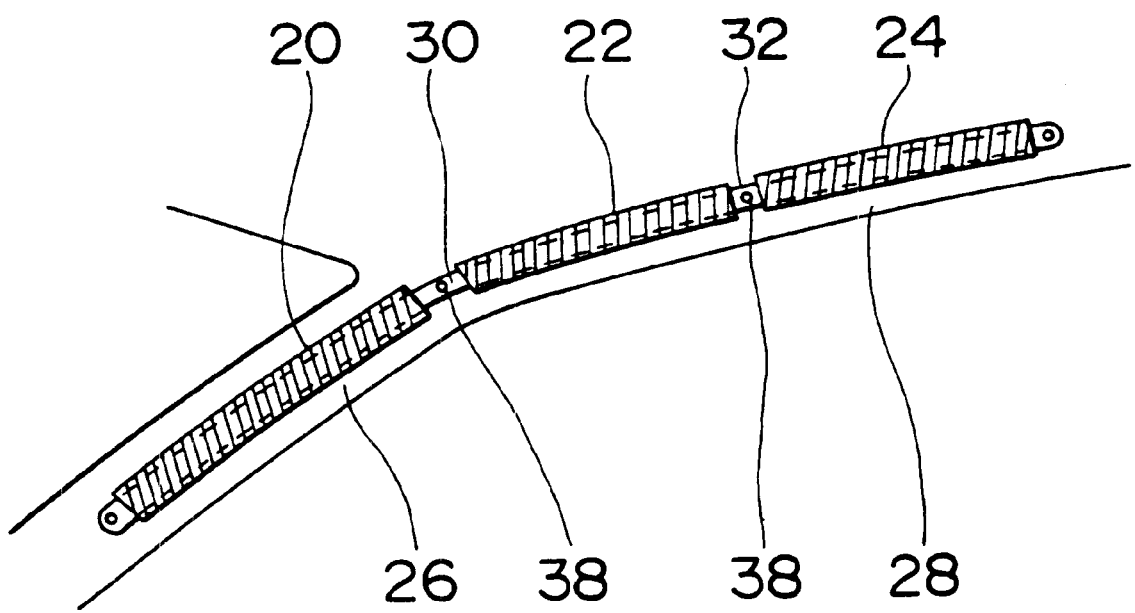
FIG. 3 is a schematic illustration of a portion of a vehicle body to which the securing structure for a hollow energy absorber of the invention can be applied.

A securing structure according to a first embodiment of the invention is a structure for coupling a plurality of hollow-shaped energy absorbers and securing them to vehicle body structural member, as best shown in the perspective view in FIG. 1 and the schematic illustration of the vehicle body structural member in FIG. 3. In the first embodiment, three energy absorbers 20, 22, 24 are secured to a front pillar 26 and a roof side rail 28, that is, vehicle body structural members.

A joint member 30 is disposed between two adjacent energy absorbers 20, 22. Likewise, another joint member 32 is disposed between two adjacent energy absorbers 22, 24. Each of the joint members 30, 32 has two fitting end portions for respectively fitting to an end portion of one of two adjacent energy absorbers and an end portion of the other one of the energy absorbers, the end portions facing each other. The joint members 30, 32 further have portions for mounting to the structural members 26, 28.

Figure 2:
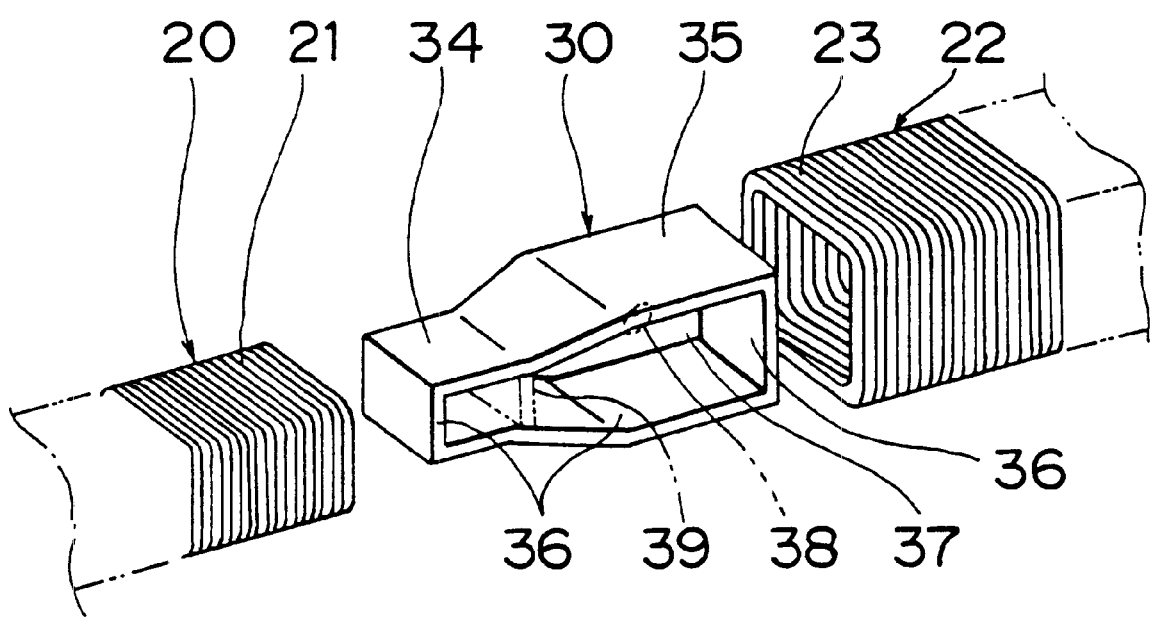
FIG. 2 is an exploded perspective view of a portion of the securing structure shown in FIG. 1.

Referring to the exploded perspective view in FIG. 2, the joint member 30 has two fitting end portions 34, 35. The two energy absorbers 20, 22 to be connected by the joint member 30 have different cross-sectional dimensions at their ends. Therefore, the fitting end portion 34 of the joint member 30 is formed so as to fit to the corresponding end portion of the energy absorber 20, and the fitting end portion 35 of the joint member 30 is formed so as to fit to the corresponding end portion of the energy absorber 22. In FIG. 1, the fitting end portion 34 of the joint member 30 fits into the end portion 21 of the energy absorber 20, and the fitting end portion 35 fits into the end portion 23 of the energy absorber 22. Instead of this fitting manner, it is also possible to adopt a fitting manner in which the fitting end portion 34 of the joint member 30 fits over the end portion 21 of the energy absorber 20, and the fitting end portion 35 fits over the end portion 23 of the energy absorber 22. The term "fit to" covers both of the fitting manners in this application.

In the first embodiment the adjacent end portions of the adjacent two energy absorbers 20, 22 coupled by the joint member 30 have different cross sectional shapes, so that the fitting end portions 34, 35 of the joint member 30 have cross sectional shapes that are substantially geometrically similar to the cross sectional shapes of the end portions of the energy absorbers 20, 22, respectively, as shown in FIG. 2. That is, the cross sectional shape of the fitting end portion 34 of the joint member 30 is substantially geometrically similar to the cross sectional shape of the end portion 21 of the energy absorber 20, and the cross sectional shape of the fitting end portion 35 of the joint member 30 is substantially geometrically similar to the cross sectional shape of the end portion 23 of the energy absorber 22. More specifically, each of the energy absorbers 20, 22 has a hollow body with a generally quadrilateral cross sectional shape, and each of the end portions 21, 23 thereof also has a generally quadrilateral cross sectional shape. On the other hand, each of the fitting end portions 34, 35 of the joint member 30 has a squared-U-shaped cross section. However, if the opening of each of the squared-U-shaped fitting end portions 34, 35 is closed by an imaginary plane, the cross sectional shape thereof becomes a quadrilateral that is substantially geometrically similar to the cross sectional shape of the corresponding energy absorber end portion. The term "substantially geometrically similar" covers the above-described shape relationship (as shown in FIG. 2).

That is, the joint member 30, which connects the adjacent ends 21, 23 of the two energy absorbers 20, 22, has such cross sectional shapes and dimensions as to fit to the end portions 21, 23 of the two energy absorbers 20, 22. Likewise, the joint member 32 has cross sectional shapes and dimensions that are defined so that the joint member 32 fits to the adjacent end portions of the two energy absorbers 22, 24.

The joint members 30, 32 may be capable or incapable of absorbing impact energy. However, it is preferable that the joint members 30, 32 be capable of absorbing impact energy, in order to absorb impact energy at the connecting portion between two energy absorbers. For energy absorption, the joint members 30, 32 may be formed as a ribbed resin piece or a foamed urethane piece. In FIGS. 1 and 2, the joint member 30 is shown as a ribbed resin piece in which a plurality of rib portions 36 are protruded from a base 37 and joined unitarily. The joint member may be formed by injection molding of a hard resin such as acrylonitrile butadiene styrene (ABS) or the like. The opposite ends of the joint member 30 are closed by rib portions 36 so as to define a hollow therein. It is also possible to provide one or more additional rib portions 39 in the hollow of the joint member in accordance with the required amount of energy to be absorbed.

After being fitted to two adjacent energy absorbers, each of the joint members 30, 32 is mounted to a vehicle body structural member by inserting, for example, a tapping screw, into a through-hole 38 formed in the joint member and screwing the screw into the structural member. The energy absorbers 20, 22, 24 are thereby secured to the structural member.

Each energy absorber may have a length, a sectional shape and dimensions that are suitable to the mounting location of the energy absorber and, furthermore, may also be formed as a suitably-selected hollow body. In this embodiment, the energy absorber 22 has greater cross sectional dimensions than the energy absorbers 20,24 as can be seen in FIG. 1. Each of the three energy absorbers 20, 22, 24 is formed of a hybrid pipe.

The front pillar 26 is two-dimensionally bent at a site where the front pillar 26 is connected to the roof side rail 28, as can be seen in FIG. 3. The front pillar 26 is also bent in a direction substantially perpendicular to the sheet of the drawing. That is, the front pillar 26 is three-dimensionally bent. According to the invention, after the two energy absorbers 20, 22 are coupled by the joint member 30 and the two energy absorbers 22, 24 are coupled by the joint member 32, the energy absorbers 20, 22, 24 are secured to the front pillar 26 and the roof side rail 28 by screwing tapping screws thereinto via the through-holes 38 of the joint members 30, 32. Therefore the invention eliminates the need to prepare and three-dimensionally bend an energy absorber having such a length as to extend along the front pillar 26 and the roof side rail 28. Moreover, by suitably determining the sectional shapes and dimensions of the energy absorbers 20, 22, 24 in accordance with the mounting locations thereof, the gap between each energy absorber and the front pillar 26 or the roof side rail 28 or the gap between each energy absorber and a pillar garnish (not shown) or a roof lining (not shown) can be eliminated, so that the energy absorbing efficiency is improved. If the energy absorbers 20, 22, 24 have great lengths, the energy absorbers 20, 22, 24 may be sequentially secured, for example, by first fitting the joint member 30 to the energy absorber 20 and fastening the joint member 30 to the front pillar 26, and subsequently fitting the energy absorber 22 at one end thereof to the joint member 30 fastening the joint member 32 fitted to the other end thereof beforehand, to the roof side rail 28, and then fitting the energy absorber 24 at one end thereof to the joint member 32. Such sequential mounting of long energy absorbers is preferable in terms of operability.

Figure 4:
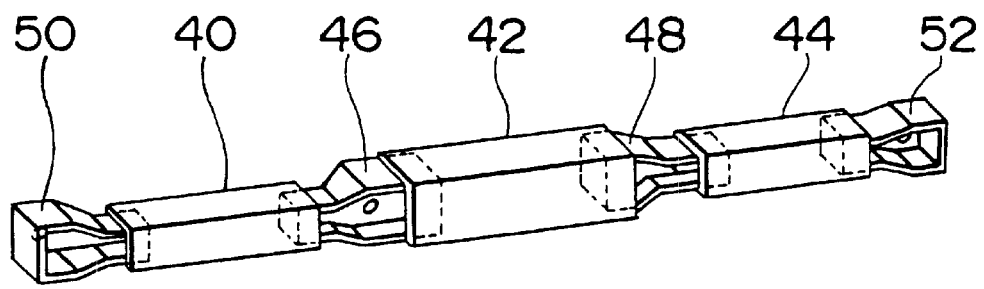
FIG. 4 is a perspective view of a second embodiment of the securing structure for a hollow energy absorber of the invention.

In a second embodiment shown in the perspective view in FIG. 4, two energy absorbers 40, 42 are coupled by a joint member 46, and two energy absorbers 42, 44 are coupled by a joint member 48. The energy absorber 42 has a cross sectional dimensions than the energy absorbers 40,44. Each of the three energy absorbers 40,42,44 is formed of a metal pipe.

In the first and second embodiments, the energy absorber 20,40 may be coupled to another energy absorber via a joint member 50, and the energy absorber 24, 44 may be coupled to another energy absorber via a joint member 52.

It is not necessary to adhere a fitting end portion of a joint member to an end portion of an energy absorber after fitting them to each other. A fitting end portion of a joint member and an end portion of an energy absorber need only to be fitted to each other tightly so that they are prevented from slipping off from each other by friction therebetween.

Figure 5:
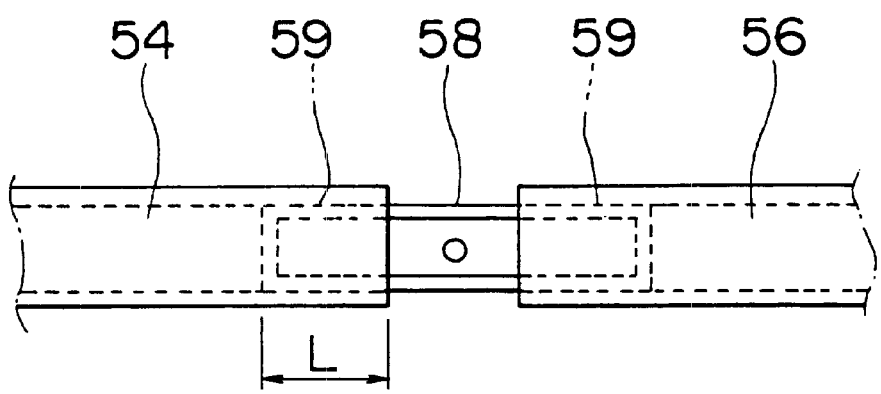
FIG. 5 is a front elevation of a third embodiment of the securing structure for a hollow energy absorber of the invention.

In a third embodiment shown in FIG. 5, two energy absorbers 54, 56 having the same sectional shape and dimensions are connected by a joint 58. Each of the energy absorbers 54, 56 is formed of a metal pipe. Each fitting end portion 59 of the joint member 58 is fitted to an energy absorber to an insert depth or length L in a slidable manner. By suitably determining the insert length L, the bending or elongation of the energy absorbers 54, 56 caused substantially in directions of an axis thereof by a compression deformation of the energy absorbers 54, 56 can be absorbed by relative sliding movements of the fitting end portions 59 of the joint member 58.

Figure 6:
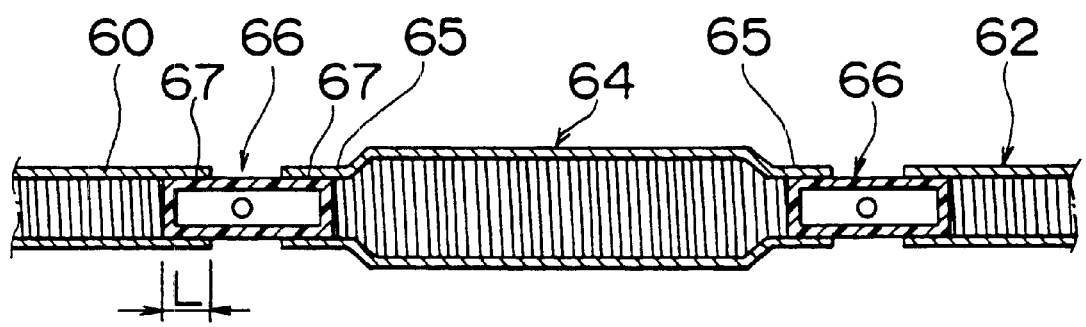
FIG. 6 is a sectional view of a fourth embodiment of the securing structure for a hollow energy absorber of the invention.

In a fourth embodiment shown in FIG. 6, an energy absorber securing structure includes two energy absorbers 60, 62 having the same sectional shape and dimensions, and an energy absorber 64 whose sectional shape and dimensions are greater than those of the energy absorbers 60, 62, and two joint members 66. Each of the three energy absorbers 60, 62, 64 is formed of a hybrid pipe. The energy absorber 64 is tapered at both ends so that the sectional shape and dimensions of end portions 65 of the energy absorber 64 are the same as those of the energy absorbers 60, 62. Therefore, two fitting end portions 67 of each joint member 66 have the same shape and dimensions. The fitting end portions 67 of the joint members 66 are fitted to the energy absorber end portions 65 to an insert length L in such a manner as to allow the joint members 66 to slide.

Figure 7:
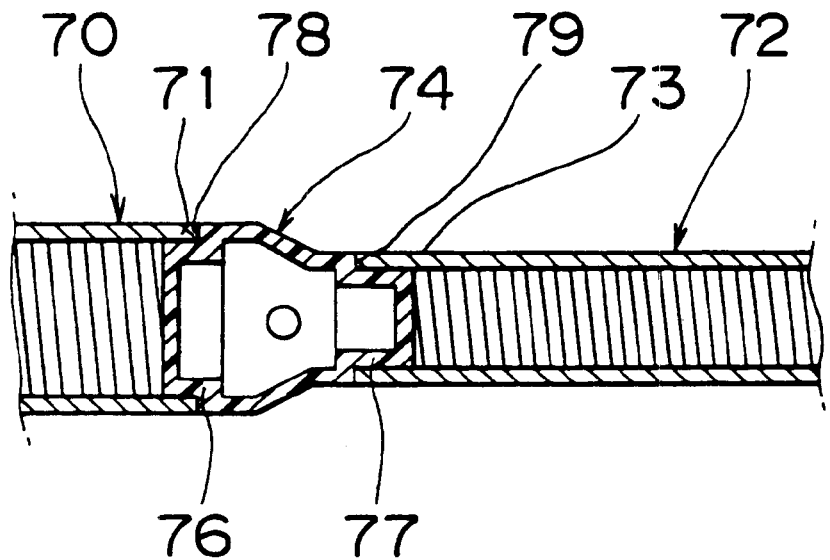
FIG. 7 is a sectional view of a fifth embodiment of the securing structure for a hollow energy absorber of the invention.

In a fifth embodiment shown in FIG. 7, two energy absorbers 70, 72 are formed of hybrid pipes, and have different sectional dimensions. The two energy absorbers 70, 72 are coupled by a joint member 74. The joint member 74 has a special configuration. That is, two fitting end portions 76, 77 of the joint member 74 extend from shoulder portions 78, 79 that have larger diameters, that is, greater distances from the center axis, than the fitting end portions 76, 77, respectively. Therefore, when the fitting end portion 76 is fitted into an end portion 71 of the energy absorber 70, the shoulder portion 78 of the joint member 74 contact an end surface of the energy absorber 70. Likewise, when the fitting end portion 77 is fitted into an end portion 73 of the energy absorber 72, the shoulder portion 79 of the joint member 74 contacts an end surface of the energy absorber 72. If joint members having comparable shoulder portions are fitted into the other end portions of the energy absorbers 70, 72 and the energy absorber assembly is secured to a vehicle body structural member, the elongation of the energy absorbers 70, 72 in the directions of an axis thereof is restricted by the joint members. Therefore, in the case of hybrid pipe energy absorbers as in this embodiment, the energy absorbing characteristics of the hybrid pipes can be adjusted by joint members.

The energy absorbers may be hybrid pipes or metal pipes formed of a metal material suitable for extrusion forming, as mentioned above. A metal pipe can easily be formed by extruding, for example, an aluminum or aluminum alloy material. Although in the foregoing embodiments a plurality of metal pipes or a plurality of hybrid pipes are connected by joint members, it is also possible to connect a metal pipe and a hybrid pipe by a joint member.

Figure 8:
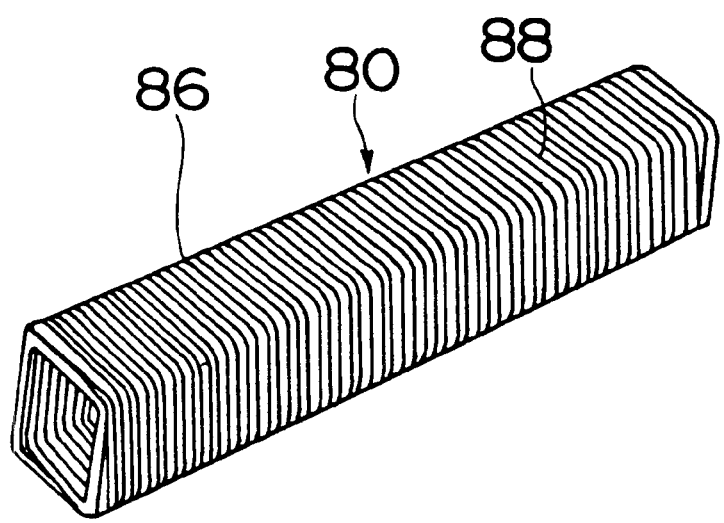
FIG. 8 is a perspective view of a hybrid pipe that can be used for the securing structure of a hollow energy absorber securing structure of the invention
Figure 9:
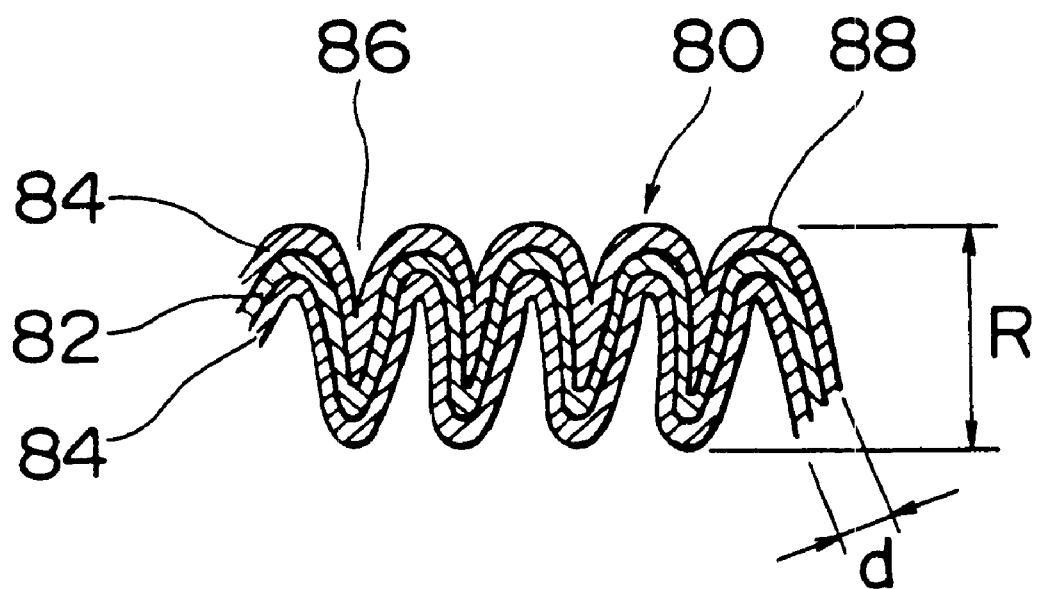
FIG. 9 is an enlarged longitudinal sectional view of a portion of the hybrid pipe shown in FIG. 8.

Referring to the perspective view in FIG. 8 and the sectional view in FIG. 9, a hybrid pipe 80 is composed of a metal foil core 82 and sheets 84 laid on and adhered to opposite surfaces of the core 82. The sheets 84 are formed from a material other than metal. The hybrid pipe 80 is formed by shaping the composite of the core 82 and the sheets 84 so that recessed portions 86 and protruded portions 88 alternate in directions of an axis of the hybrid pipe 80 and directions of a circumference or periphery thereof (for example, in a helical arrangement).

In the hybrid pipe 80 shown in FIGS. 8 and 9, the core 82 is made of a hard aluminum foil, and the sheets 84 are made of kraft paper. The aluminum foil has a thickness of at least 0.05 mm and a width of at least 30 mm. The kraft paper sheets have a thickness of at least 0.2 mm and a width of at least 30 mm. The core 82 may also be made of a stainless steel foil, a magnesium alloy foil or the like. The sheets 84 may also be made of a resin or the like. In the hybrid pipe shown in FIG. 8, the protruded and recessed portions extend helically. Instead of such a helical configuration, it is also possible to adopt a looped configuration in which a recessed portion 86 extends around the periphery of the pipe and forms a complete loop and, adjacent to the recessed portion 86, two independent protruded portions 88 extend around the periphery of the pipe.

In the first to fifth embodiments, each joint member has a square-U-shaped cross section, and has rib portions that are formed at both ends, thereby forming closed ends. Instead of such a configuration, a joint member may also have a hollow that extends therethrough in the directions of an axis of the joint member.

Figure 10:
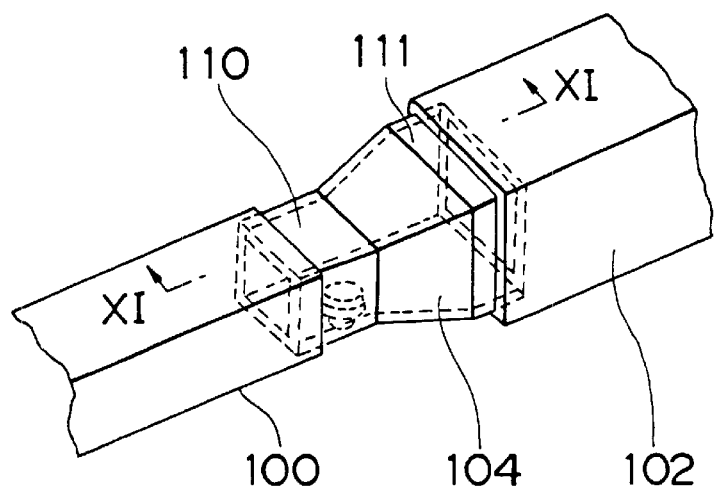
FIG. 10 is a perspective view of a sixth embodiment of the securing structure for a hollow energy absorber of the invention.
Figure 11:
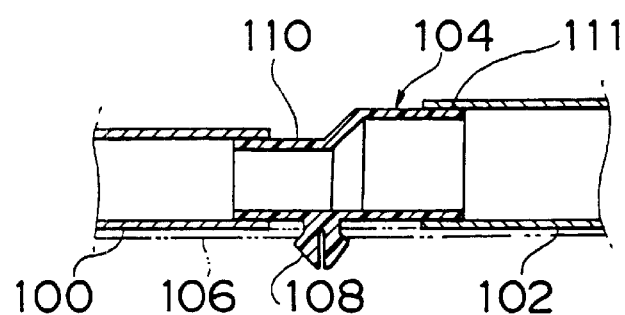
FIG. 11 is a sectional view taken on line XI—XI in FIG. 10.

In a sixth embodiment shown in the perspective view in FIG. 10 and the sectional view in FIG. 11, energy absorbers 100, 102 are formed of metal pipes. The energy absorber 102 has greater sectional dimensions than the energy absorber 100. A joint member 104 is formed of a resin so as to absorb impact energy. The joint member 104 has a hollow that extends trough the joint member 104 in the directions of an axis of the joint member 104. The joint member 104 has, at a site that faces a structural member 106, a securing protrusion 108 that is formed together with the joint member 104. Therefore, after the two energy absorbers 100, 102 are coupled by fitting an end portion of each of the energy absorbers 100, 102 to the corresponding one of fitting end portions 110, 111 of the joint member 104, the coupled energy absorbers 100, 102 and joint member 104 can be secured to the structural member 106 by inserting the securing protrusion 108 into a hole formed in the structural member 106.

Figure 12:
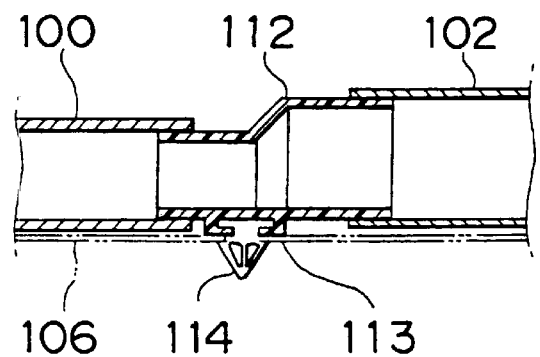
FIG. 12 is a sectional view similar to that of FIG. 11, illustrating a modification of the sixth embodiment.

A joint member 112 shown in the sectional view in FIG. 12 is formed or molded from a resin. The joint member 112 has, at a site that faces the structural member 106, a mounting seat 113 that is formed together with the joint member 112. A separately formed resin clip 114 is mounted to the mounting seat 113, and used to secure the joint member 112 to the structural member 106. The clip 114 may be an ordinary clip that is often used to mount interior trims, that is, mass-produced clips can be used.

Although in the first to sixth embodiments, a joint member is used to couple two energy absorbers and secure the energy absorbers to a structural member, it is also possible to couple two energy absorbers and secure them to a structural member without using a joint member. Such a structure according to the invention will be described below.

Figure 13:
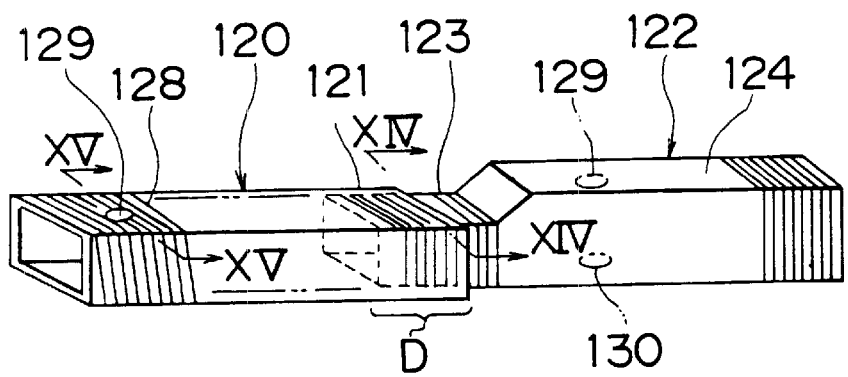
FIG. 13 is a perspective view of a seventh embodiment of the securing structure for a hollow energy absorber of the invention.
Figure 14:
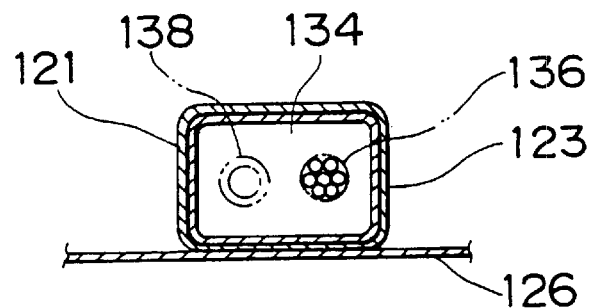
FIG. 14 is a sectional view taken on line XIV—XIV in FIG. 13.
Figure 15:
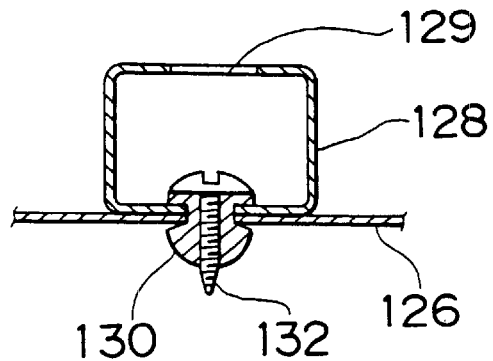
FIG. 15 is a sectional view taken on line XV—XV in FIG. 13.

In an energy absorber securing structure according to a seventh embodiment shown in the perspective view in FIG. 13 and the sectional views in FIGS. 14 and 15, two hollow energy absorbers 120, 122 are formed of hybrid pipes. The cross sectional shape and dimensions of the energy absorber 120 are substantially uniform over the length thereof in the directions of an axis of the energy absorber 120. In contrast, the energy absorber 122 has a narrowed or contracted fitting end portion 123. That is, the fitting end portion 123 of the energy absorber 122 is reduced in sectional area by, for example, compressing the end portion from outside, so that the fitting end portion 123 is fittable into an end portion 121 of the energy absorber 120. The sectional dimensions of a portion 124 of the energy absorber 122 other than the fitting end portion 123 are greater than those of the energy absorber 120. The sectional shape of the fitting end portion 123 of the energy absorber 122 is substantially geometrically similar to the sectional shape of the end portion 121 of the energy absorber 120.

To couple two energy absorbers having the same sectional shape and dimensions, an end portion of one energy absorber is narrowed or contracted as in the seventh embodiment; alternatively, an end portion of one energy absorber may be expanded to increase the sectional area so that the end portion is fittable over an end portion of the other energy absorber. An end portion of an energy absorber can be expanded by, for example, placing the energy absorber in a mold, with an elastic bag made of rubber of the like being placed in the end portion, and then inflating the bag. It is also possible to perform both processes, that is, to expand an end portion of one energy absorber and narrow or contract an end portion of the other energy absorber. This combined process is particularly suitable if there is a danger that a hollow energy absorber may be broken by heavy expansion or contraction of an end portion of the energy absorber.

If the sectional area of an end portion of an energy absorber formed of a hybrid pipe is reduced or expanded, the load-displacement energy absorbing characteristic changes from that demonstrated before the reducing or expanding process, that is, the end portion acquires a unique energy absorbing characteristic. Therefore, the energy absorbing characteristics of an energy absorber can be adjusted through the contraction or expansion of an end portion of the energy absorber.

The two energy absorbers 120, 122 are coupled by fitting the fitting end portion 123 of the energy absorber 122 to the end portion 121 of the energy absorber 120. Subsequently, at least one of the two energy absorbers 120,122 is mounted to the structural member 126. In the seventh embodiment, a grommet 130 is disposed at an opening formed in a portion of the energy absorber 120 other than the end portion 121 thereof, that is, a portion 128 thereof that is not overlapped with the fitting end portion 123 of the energy absorber 122 fitted to the end portion 121 of the energy absorber 120. A through-hole 129 is formed in the energy absorber 120 at a site facing the grommet 130, as best shown in FIG. 15. The coupled energy absorbers 120, 122 are tentatively held to the structural member 126 by snapping the grommet 130 into a mounting hole formed in the structural member 126. Subsequently, a tapping screw 132 is brought into the energy absorber 120 via the through-hole 129 and screwed into the grommet 130, to secure the coupled energy absorbers 120, 122 to the structural member 126. Since the energy absorbers 120, 122 can be tentatively held to the structural member 126 by using the grommet 130, the ease of operation of securing the energy absorbers to the structural member improves. It is also possible to mount a grommet 130 to the energy absorber 122, instead of the energy absorber 120, and form a through-hole 129 in the energy absorber 122, as indicated by phantom lines in FIG. 13, so that the energy absorber 122 can also be secured to the structural member 126. It is also possible to mount a grommet 130 and form a through-hole 129 in overlapping portions of the energy absorbers 120, 122, so that the energy absorbers 120, 122 can be simultaneously secured to the structural member 126 by using the grommet 130.

Figure 16:
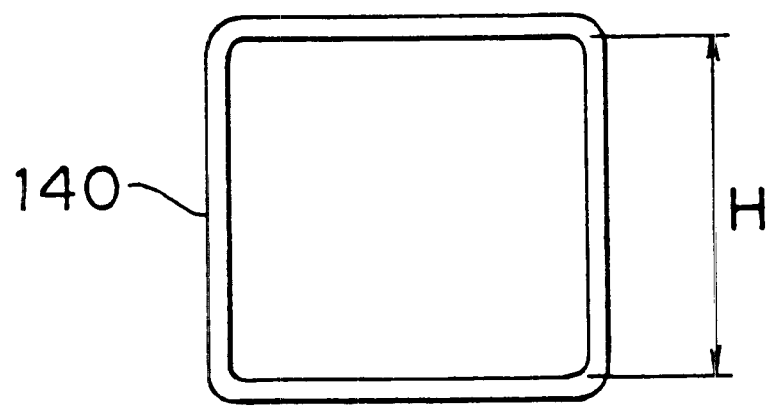
FIG. 16 is a schematic illustration of a fitting-over end portion of two end portions in the securing structure shown in FIG. 13.
Figure 17:
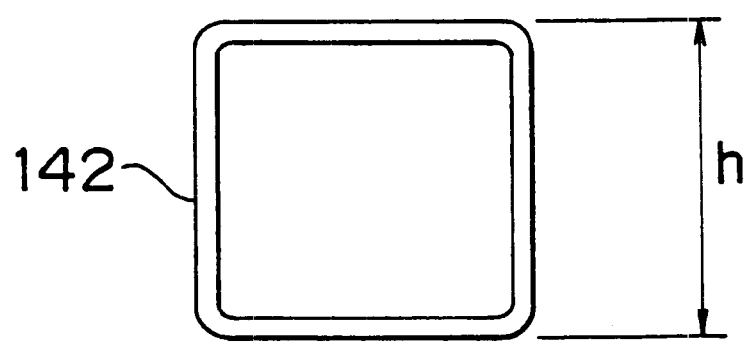
FIG. 17 is a schematic illustration of the fitting-into end portion of the two end portions in the securing structure shown in FIG. 13.

Since the two hollow energy absorbers 120, 122 are coupled by fitting the adjacent ends thereof to each other, and then secured to the structural member 126, a space 134 defined inside the energy absorbers 120, 122 extends along the structural member 126 as can be seen from FIG. 14. If a wire harness 136 or a duct 138 is inserted into the space 134, the wire harness 136 or the duct 138 extends along the structural member 126 without being exposed to the outside of the energy absorbers 120, 122, so that the wire harness 136 or the duct 138 is protected by the energy absorbers 120, 122. In this case, the amount of possible deformation of the energy absorbers 120, 122 is reduced by the wire harness or the duct. However, this drawback can be eliminated by, for example, changing the sectional shape of the energy absorbers 120, 122 or increasing the wall thickness of the energy absorbers or the apparent wall thickness thereof To couple two energy absorbers by fitting adjacent ends thereof to each other, the distance between inner opposite sides of a generally square cross section of a larger-size end portion 140 that fits over, that is, an inner side dimension H of the end portion 140 indicated in FIG. 16, needs to be greater than the distance between outer opposite sides of a generally square cross section of a smaller-size end portion 142 that fits in, that is, an outer side dimension h indicated in FIG. 17. The inside dimension H of the end portion 140 and the outer side dimension h of the end portion 142 can be determined considering the fitting or overlapping length D (see FIG. 13) and the types of energy absorbers. Since the energy absorbers may be formed of metal pipes or hybrid pipes, there are three combinations of two energy absorbers having the end portions 140, 142, respectively, that is, (a) two hybrid pipe energy absorbers, (b) one hybrid pipe energy absorber and one metal pipe energy absorber, and (c) two metal pipe energy absorbers. The magnitude relationship of the friction resistances that occur over the fitting length D in the three combinations is (a)>(b)>(c). Therefore, if the fitting length D is uniform with respect to the three combinations, the difference between the inner side dimension H and the outer side dimension h, that is, (H–h), may be set so that the side dimension difference (H–h) decreases in the order of combination (a), combination (b) and combination (c). If the side dimension difference (H–h) is uniform, the fitting length D may be set so that the fitting length D increases in the order of combination (a), combination (b) and combination (c).

Besides the above-explained general guides for setting the fitting length D and the side dimension difference (H–h), it is also possible to set the fitting length D so that if at least one of coupled energy absorbers is deformed by an impact load applied thereto, the energy absorbers will not slip off from each other. It is also possible to set the fitting length D and the side dimension difference (H–h) so that if one of two energy absorbers coupled at end portions thereof receives a load in a direction away from the other, the fitting end portions undergo a magnitude of friction that prevents the two energy absorbers from slipping off from each other.

Combination (b) of the aforementioned three combinations includes two sub-combinations: (b1) a hybrid pipe energy absorber provided with the larger-side end portion 140 and a metal pipe energy absorber provided with the smaller-size end portion 142; and (b2) a metal pipe energy absorber provided with the larger-side end portion 140 and a hybrid pipe energy absorber provided with the smaller-size end portion 142.

Referring back to FIG. 9, the actual wall thickness d of the hybrid pipe 80 is the sum of the thicknesses of the core 82 and the opposite side sheets 84. The apparent wall thickness R of the hybrid pipe 80 is the distance between an outermost point on the curved outer surface of a protruded portion 88 and an innermost point on the curved inner surface of an adjacent recessed portion 86, the distance therebetween being measured in a direction perpendicular to the axis of the hybrid pipe 80 in a longitudinal section thereof as in FIG. 9. In a production process of a hybrid pipe, an intermediate pipe product having an actual wall thickness d is formed, and the intermediate pipe product is corrugated substantially continually to form a hybrid pipe having an apparent wall thickness R.

Figure 18:
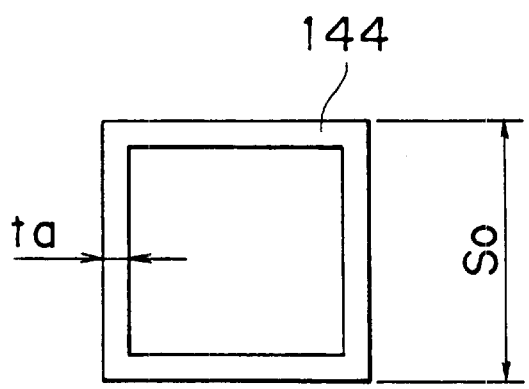
FIG. 18 is a schematic illustration of a fitting-over end portion of a hybrid pipe, for illustrating the load-displacement energy absorbing characteristic.
Figure 19:
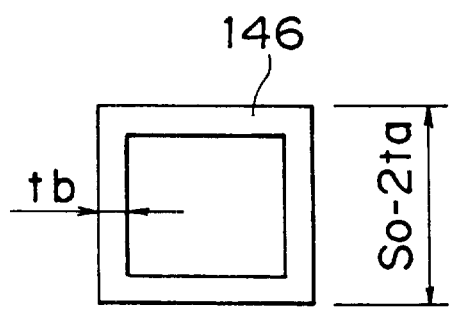
FIG. 19 is a schematic illustration of a fitting-into end portion of a hybrid pipe, for illustrating the load-displacement energy absorbing characteristic.
Figure 20:
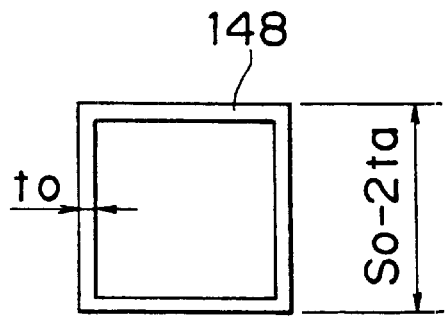
FIG. 20 is a schematic illustration of a fitting-into end portion of an intermediate pipe, for illustrating the load-displacement energy absorbing characteristic.

FIGS. 18, 19 and 20 are schematic illustrations of generally square-shaped cross sections of energy absorbers. A fitting-over end portion 144 shown in FIG. 18 is of a hybrid pipe. A fitting-into end portion 146 shown in FIG. 19 is of a hybrid pipe. A fitting-into end portion 148 shown in FIG. 20 is of an intermediate pipe. The end portions 146, 148 shown in FIGS. 19 and 20 are fittable into the end portion 144 shown in FIG. 18. It is assumed that the intermediate pipe is formed by a flat hybrid pipe that is not corrugated, in order to simplify the description below. The description below applies to general metal pipes as well. The fitting-over end portion 144 has an outer side dimension $S_0$, an apparent wall thickness ta, and an actual wall thickness to. The fitting-into end portion 146 has an outer side dimension $(S_0-2ta)$ substantially equal to the inner side dimension of the fitting-over end portion 144, and an apparent wall thickness tb and an actual wall thickness $t_0$. The fitting-into end portion 148 has an outer side dimension ($S_0-2ta$) substantially equal to the inner side dimension of the fitting-over end portion 144, and an apparent wall thickness to equal to the actual wall thickness. If the end portions 144, 146, 148 are completely compressed or flattened, the apparent wall thicknesses thereof becomes equal to the actual wall thickness. Therefore, the effective deformation stroke of the fitting-over end portion 144 is expressed as $S_0-2t_0$, and the effective deformation stroke of the fitting-into end portions 146, 148 is expressed as $S_0-(ta+t_0)$.

Although both the fitting-over end portion 144 and the fitting-into end portion 146 are of hybrid pipes, the apparent wall thickness tb of the fitting-into end portion 146 is set greater than the apparent wall thickness ta of the fitting-over end portion 144. In general, the apparent wall thickness of the fitting-over end portion 144 and the apparent wall thickness of the fitting-into end portion 146 can be set independently of each other. Therefore, the aforementioned magnitude relationship between the apparent wall thickness of the fitting-over end portion 144 and the apparent wall thickness of the fitting-into end portion 146 may be reversed. Furthermore, the apparent wall thicknesses of the fitting-over end portion 144 and the fitting-into end portion 146 may be equal. The energy absorbing characteristics of the overlapped end portions depend on the apparent wall thicknesses of the end portions 144, 146 as explained below. Therefore, the energy absorbing characeristics can be adjusted by changing the apparent wall thicknesses of the end portions 144, 146.

Figure 21:
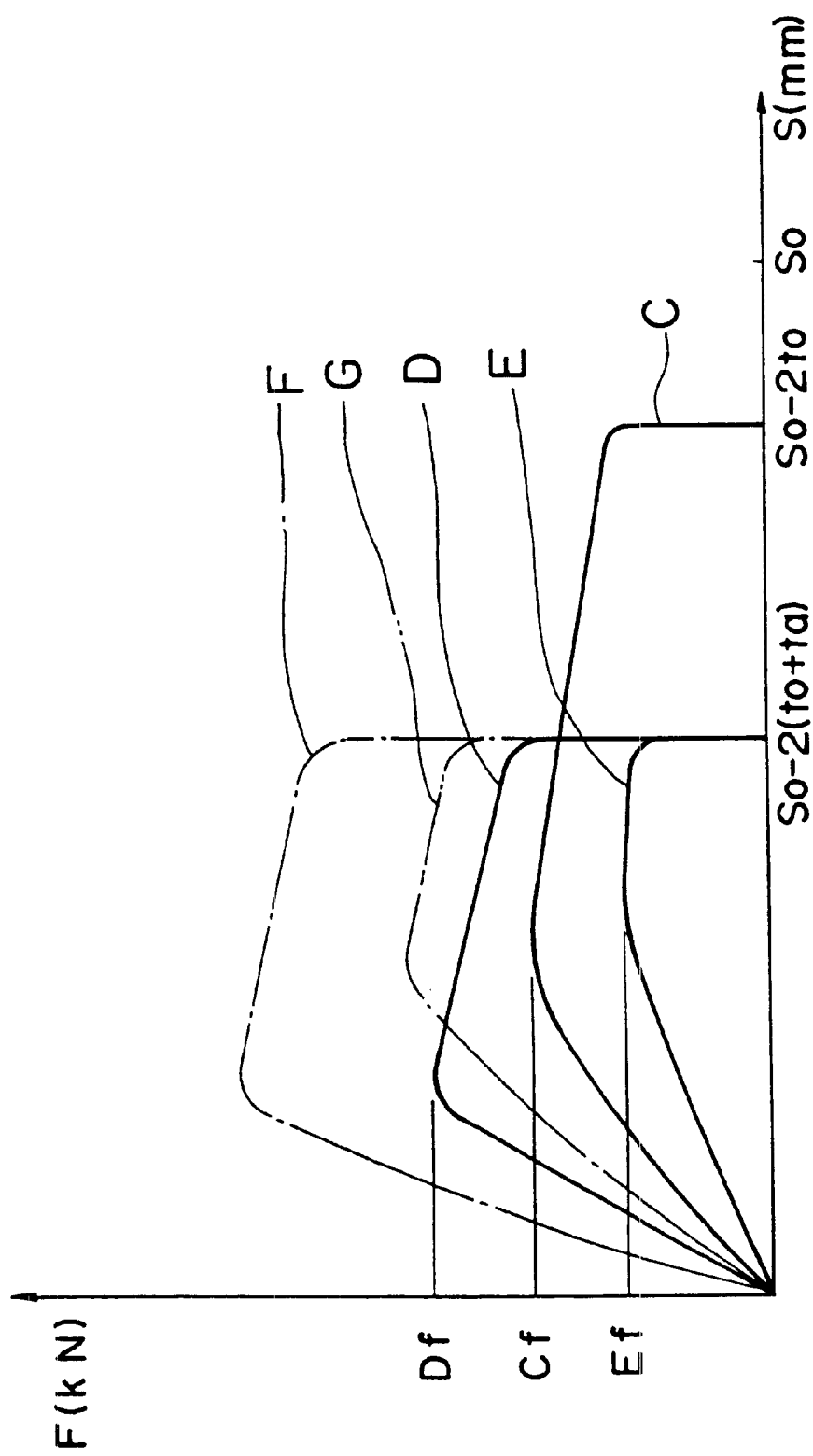
FIG. 21 is a graph indicating the load-displacement energy absorbing characteristic.

FIG. 21 is a graph indicating the load(F) displacement(S) energy absorbing characteristic. The hybrid pipe end portion 144, the hybrid pipe end portion 146 and the intermediate pipe end portion 148 individually demonstrate different energy absorbing characteristics indicated by curves C, D, E, respectively. The energy absorbing characteristic curve of the hybrid pipe 146 has a peak value Df The peak value Df is greater than the peak value Cf of the characteristic curve the hybrid pipe 144 and the peak value Ef of the characteristic curve of the intermediate pipe 148, because the apparent wall thickness tb of the hybrid pipe 146 is greater than the apparent wall thickness ta of the hybrid pipe 144 and the actual wall thickness to of the intermediate pipe 148 (equal to the apparent wall thickness thereof). In the hybrid pipes 144, 146, the reaction load gradually decreases after reaching the respective peak values Cf, Df whereas in the intermediate pipe 148, the reaction load remains substantially at the peak value Ef after reaching the value. This can be explained as follows. When a hybrid pipe is comprised by a load acting thereof in a direction intersecting the axis of the hybrid pipe, elongation in the directions of the axis occurs, and the apparent wall thickness gradually decreases as the axial elongation progresses. In contrast, the intermediate pipe does not substantially elongate in the directions of the axis thereof. In the graph of FIG. 21, it is indicated that the displacement of the hybrid pipe 144 is greater than the displacement of the hybrid pipe 146 and the intermediate pipe 148. The different displacements are based on the different effective deformation strokes of the pipes described above.

The curve F in FIG. 21 indicates the characteristic demonstrated by the fitting-over hybrid pipe 144 and the fitting-into hybrid pipe 146 fitted to each other, corresponding to the aforementioned combination (a). The curve G indicates the characteristic demonstrated by the fitting-over hybrid pipe 144 and the fitting-into intermediate pipe 148 fitted to each other, corresponding to the aforementioned sub-combination (b1). Although the energy absorbing characteristic indicated by the curve F is based on the characteristic of the hybrid pipe 144 and the characteristic of the hybrid pipe 146 combined, the displacement indicated by the curve F is restricted by the displacement of the hybrid pipe 146. Although the energy absorbing characteristic indicated by the curve G is based on the characteristic of the hybrid pipe 144 and the characteristic of the intermediate pipe 148 combined, the displacement indicated by the curve G is restricted by the displacement of the intermediate pipe 148.

Figure 22:
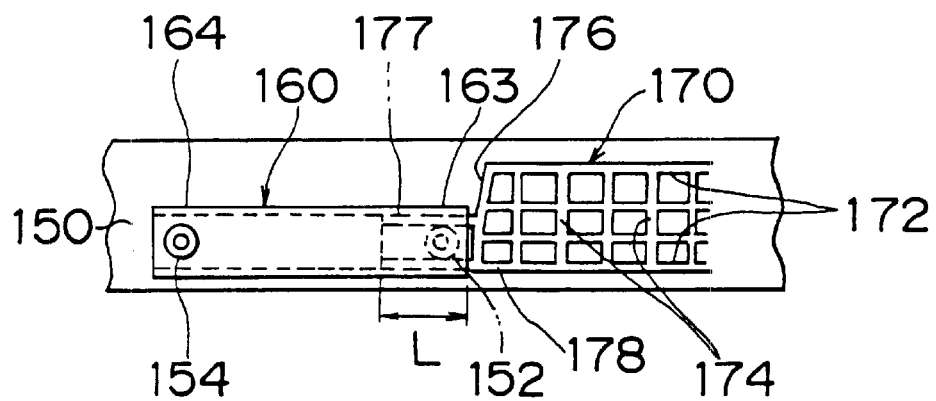
FIG. 22 is a bottom plan view of an eighth embodiment of the securing structure for a hollow energy absorber of the invention.
Figure 23:
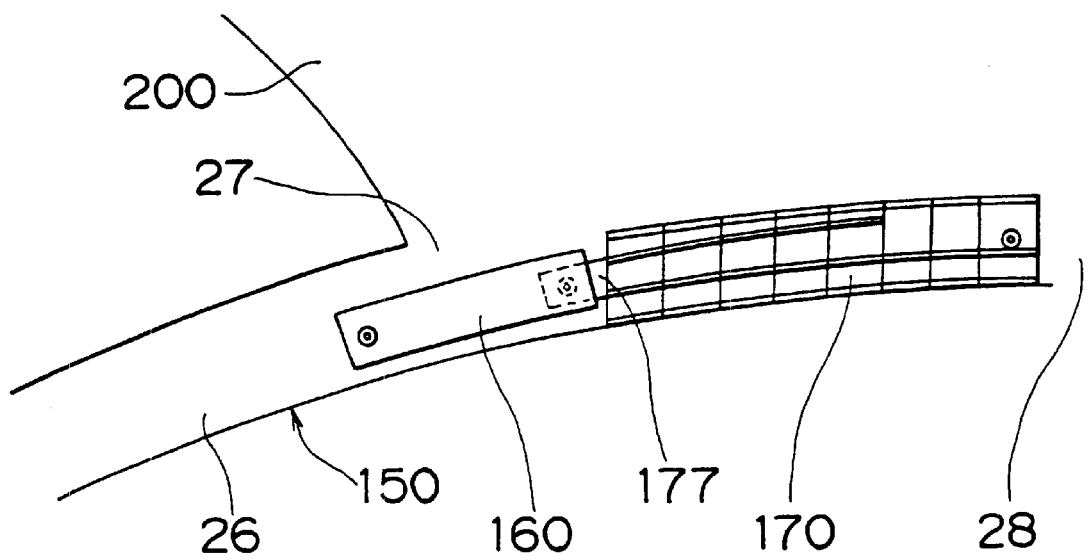
FIG. 23 is a side view illustrating the eighth embodiment, wherein a structural member corresponding to the securing structure includes a front pillar and a roof side rail.

FIGS. 22 and 23 show a bottom plan view and a side view, respectively, of an energy absorber securing structure according to an eighth embodiment of the invention, for securing a hollow energy absorber and a resin-made grid rib member capable of absorbing impact energy, to a structural member. An energy absorber 160 and a grid rib member 170 are laid along a structural member 150 extending in a direction of the length, and secured to the structural member 150.

The structural member 150 is a member having a great rigidity, for example, a front pillar, a center pillar, a quarter pillar, a roof side rail, a header or the like. In FIGS. 22 and 23, the structural member 150 includes a front pillar 26 and a roof side rail 28. A header 200 extends from an intersecting portion 27 between the front pillar 26 and the roof side rail 28 in a direction of the width of the vehicle body.

The hollow energy absorber 160 may be formed by a hybrid pipe or a metal pipe formable by extrusion. A metal pipe can easily be formed so as to have a desired sectional shape, by extrusion. A hybrid pipe can easily be formed so as to have a desired sectional shape, by performing a required shaping process after the forming process. The energy absorbing characteristics of the energy absorber 160 can be adjusted by changing the plate thickness of a metal pipe or the apparent wall thickness of a hybrid pipe, that is, a thickness measured between an outermost point on the curved outer surface of a protruded portion and an innermost point on the curved inner surface of a recessed portion, or by changing the pitch between adjacent protruded portions (or adjacent recessed portions) of a hybrid pipe.

The metal pipe is formed by extruding an aluminum or aluminum alloy material or the like. The extruded metal pipe may be used without any further process performed thereon. It is also possible to cut an extruded metal pipe into a predetermined length and twist the cut pipe about the axis thereof before using it as a hollow energy absorber 160. A metal pipe twisted about its axis has a greater rigidity than a merely extruded metal pipe, and achieves a load-displacement energy absorbing characteristic in which the reaction load sharply rises.

As for the hybrid pipe, a pipe as shown in FIGS. 8 and 9 may be used.

The grid rib member 170 is formed by injection molding of a hard resin such as ABS. The grid rib member 170 has a lot of longitudinal ribs 172 (four longitudinal ribs in FIG. 22) and a plurality of lateral ribs 174.

The longitudinal ribs 172 and the lateral ribs 174 extend throughout the grid rib member 170 in directions perpendicular to each other in the sheet of the bottom plan view drawing of FIG. 22. The grid rib member 170 does not have either a top wall (or rib) or a bottom wall (or rib). The longitudinal ribs 172 extend in the directions of the length of the grid rib member 170. The thickness of the longitudinal ribs 172 and the lateral ribs 174 may be set within the range of about 1 mm to about 3 mm. The height thereof may be set within the range of about 10 mm to about 20 mm in accordance with the magnitude of the rib interval.

The grid rib member 170 has an extended portion 177 which protrudes from an end surface 176 facing the energy absorber 160 and which is fittable to an end portion 163 of the energy absorber 160. An end portion 178 of the grid rib member 170 a faces the energy absorber 160 is connected to the energy absorber 160 by fitting the extended portion 177 to the end portion 163 of the energy absorber 160 mounted to the structural member 150. The grid rib member 170 is thereby secured to the structural member 150.

As indicated in FIG. 22, the extended portion 177 of the grid rib member 170 has an insert length L. A length of the extended portion 177 substantially equal to the insert length L is inserted and fitted into the end portion 163 of the energy absorber 160. Preferably, the insert length L is determined so that the friction engagement between the extended portion 177 and the end portion 163 provides a sufficiently high coupling strength. For example, an insert length of 10–30 mm is preferable. The extended portion 177 of the grid rib member 170 may have any shape as long as it conforms to the end portion 163 of the energy absorber 160.

The extended portion 177 of the grid rib member 170 and the end portion 163 of the energy absorber 160 may be connected by using a fastening device 152 such as a tapping screw. In this case, the insert length may be reduced from the aforementioned insert length L. The extended portion 177 and the end portion 163 may also be connected by employing both the friction engagement and the tapping screw 152, thereby further increasing the coupling strength.

Figure 24:
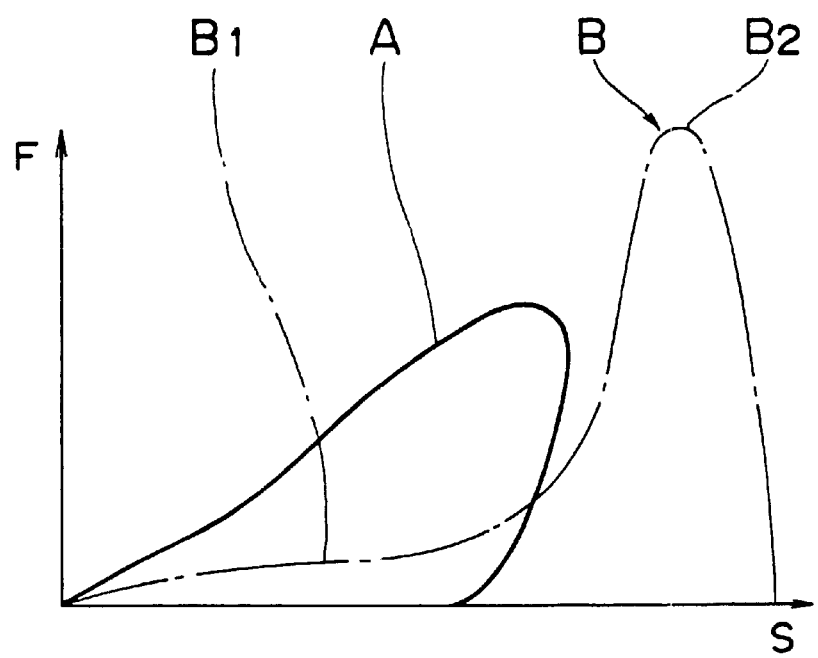
FIG. 24 is a graph indicating the load-displacement energy absorbing characteristic.

FIG. 24 is a graph indicating the load(F)-displacement(S) energy absorbing characteristic, in which a curve A indicates the characteristic achieved in a case where a grid rib member is coupled to an energy absorber by friction engagement with a sufficient insert length, and a curve B indicates the characteristic achieved in a case where a grid rib member is fixed to an energy absorber by a fastening device provided at a single site. In comparison with the characteristic curve A, the characteristic curve B indicates that the reaction load gently increases as the grid rib member bends as indicated by B1. After the bending deformation, the reaction load sharply increases to reach a peak value as indicated by B2. Therefore, by reducing the bending deformation of the grid rib member, the initial rising of the reaction load can be made sharper, and the peak value can be reduced.

The energy absorber 160 and the grid rib member 170 may also be coupled by fitting the extended portion 177 of the grid rib member 170 to the end portion 163 of the energy absorber 160 after the energy absorber 160 is mounted to the structural member 150 by using a fastening device 154, such as a tapping screw, which is provided in an end portion 164 of the energy absorber 160 remote from the end portion 163. The energy absorber 160 and the grid rib member 170 may also be coupled by fitting the extended portion 177 to the end portion 163 before the energy absorber 160 and the grid rib member 170 are mounted to the structural member 150 by using the fastening device 154 provided in the end portion 164 of the energy absorber 160. In this coupling process, the energy absorber 160 and the grid rib member 170 are coupled before they are connected to any other member.

Figure 25:
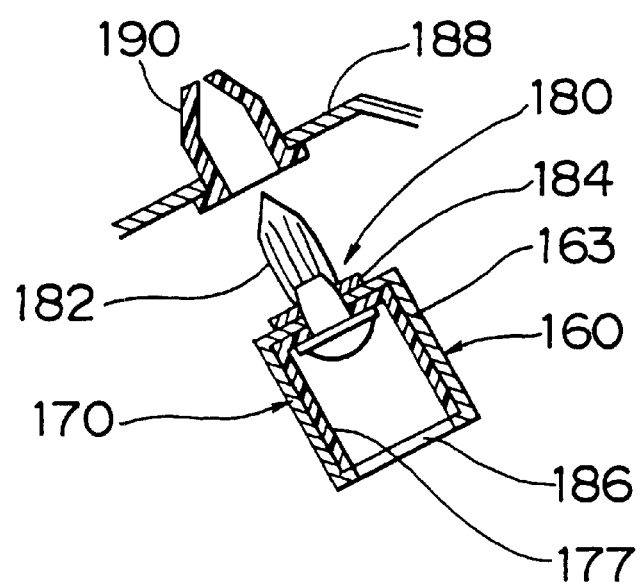
FIG. 25 is a sectional view of a ninth embodiment of the securing structure for a hollow energy absorber of the invention, wherein a sub-assembly of the hollow energy absorber and a resin-made grid rib member is about to be secured to a vehicle body structural member.
Figure 26:
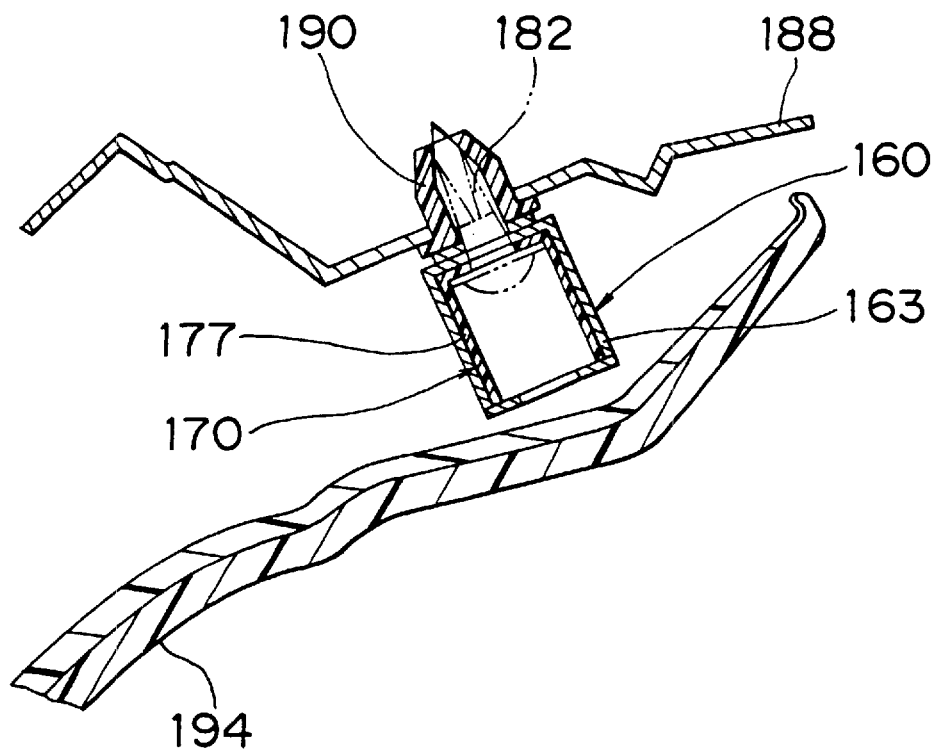
FIG. 26 is a sectional view of the ninth embodiment, wherein the sub-assembly of the energy absorber and the resin-made grid rib member has been secured to the vehicle body structural member.

According to a ninth embodiment, the energy absorber 160 and the grid rib member 170 are coupled to form a sub-assembly as shown in the sectional views in FIGS. 25 and 26. That is, an extended portion 177 of the grid rib member 170, which extends from an end surface of the grid fib member 170 facing an end portion 163 of the energy absorber 160 and which is fittable to the end portion 163, is fitted to the end portion 163 of the energy absorber 160.

Subsequently, the extended portion 177 and the end portion 163 are connected by a fixing device 180, thereby forming a sub-assembly.

In the ninth embodiment, the fixing device 180 includes a tapping screw 182 and a paper washer 184. The extended portion 177 has a generally square-U cross sectional shape. The extended portion 177 is connected to the end portion 163 so that the opening of the square-U section faces downward as shown in FIGS. 25 and 26. The end portion 163 has a through-hole 186 at a site facing the opening of the extended portion 177. The tapping screw 182 is brought into the opening of the extended portion 177 via the through-hole 186 of the end portion 163, and then passed through wall portions of the extended portion 177 and the end portion 163. Subsequently, the paper washer 184 is engaged with the tapping screw 182 to prevent the tapping screw 182 from slipping off The extended portion 177 and the end portion 163 are thereby tentatively connected to each other. After the tentatively connected sub-assembly is placed at a position corresponding to a grommet 190 mounted to an inner panel 188, that is, a structural member, the tapping screw 182 is screwed into the grommet 190 to secure the sub-assembly to the inner panel 188. Thus, the extended portion 177 of the grid rib member and the end portion 163 of the energy absorber are secured to the inner panel 188 by so called joint fastening. After the energy absorber 160 and the grid rib member 170 are secured to the inner panel 188, a roof lining 194 is mounted.

Figure 27:
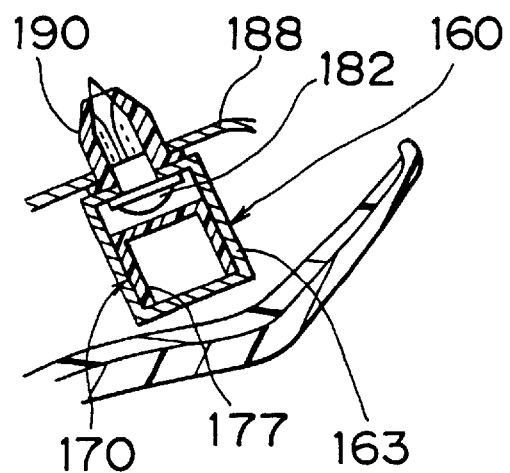
FIG. 27 is a sectional view of a modification of the ninth embodiment, wherein a sub-assembly of an energy absorber and a resin-made grid rib member has been secured to a vehicle body structural member.

Although the above-described sub-assembly is secured to the inner panel 188 by joint fastening, it is also possible to secure a sub-assembly to the inner panel 188 in a different manner. For example, as shown in FIG. 27, the end portion 163 of the energy absorber 160 and the extended portion 177 of the grid rib member 170 are tentatively connected to each other by friction engagement to form a sub-assembly. The tapping screw 182 is inserted and passed through the end portion 163 at a site apart from the extended portion 177, and then screwed into the grommet 190 to secure the end portion 163 of the energy absorber to the inner panel 188.

Figure 28:
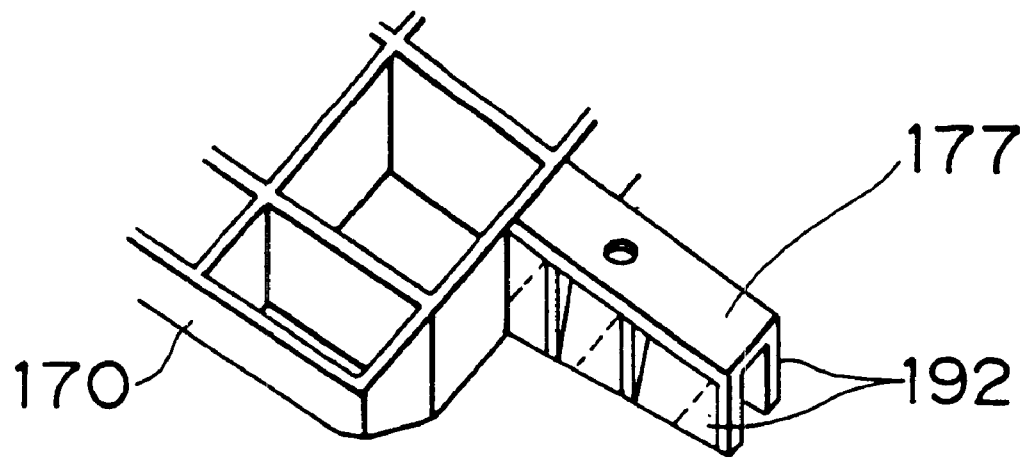
FIG. 28 is a perspective view of a portion of a resin-made grid rib member.
Figure 29:
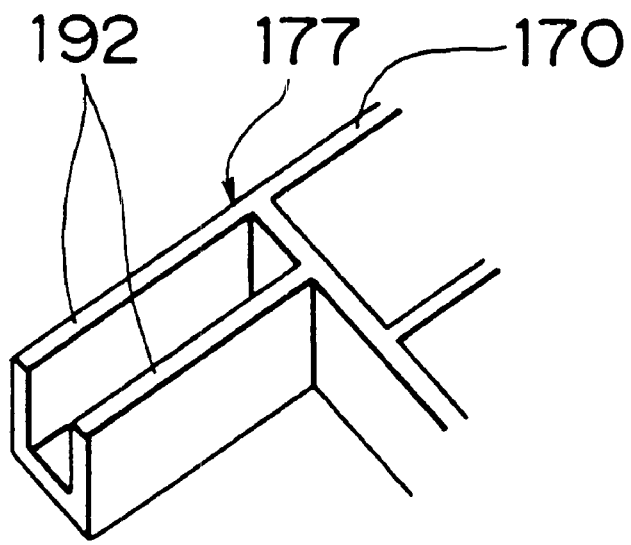
FIG. 29 is a perspective view of an extended portion of the grid rib member shown in FIG. 28, viewed from a side of the extended portion opposite from the side thereof shown in FIG. 28.

The extended portion 177 of the grid rib member 170 may be capable or incapable of absorbing impact energy. It is preferred that the grid rib member 170 have ribs 192 capable of absorbing energy, as shown in the perspective views in FIGS. 28 and 29. The ribs 192 of the extended portion 177 are inserted into an end portion of an energy absorber, so that the time of an impact, the ribs 192 deform together with the end portion. Therefore, the ribs 192 may be thinner than the longitudinal ribs 172 or the lateral ribs 174.

As mentioned above, the front pillar 26 is two-dimensionally bent at a site where the front pillar 26 is connected to the roof side rail 28, as can be seen in FIG. 23. The front pillar 26 is also bent in a direction substantially perpendicular to the sheet of the drawing. That is, the front pillar 26 is three-dimensionally bent. Therefore, it is preferred that the energy absorber 160 be disposed in the intersecting portion 27 between the front pillar 26 and the roof side rail 28, and the grid rib member 170 be disposed along the roof side rail 28. If an impact occurs on this arrangement, the energy absorber 160, having a sharp-rising energy absorbing characteristic, absorbs impact energy in a relatively small interval space between the intersecting portion 27 and the interior roof lining (not shown) disposed inwardly of the intersecting portion 27, and the grid rib member 170 absorbs impact energy in an interval space between the roof side rail 28 and the roof lining, the interval space being greater than the aforementioned interval space between the intersecting portion 27 and the roof lining.

In FIG. 23, a resin-made grid rib member may be disposed in a portion of the front pillar 26 forward of the energy absorber 160. It is also possible to dispose a different energy absorber in that portion.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A hollow energy absorber securing structure, comprising:

a plurality of hollow energy absorbers, wherein at least two of the energy absorbers are connected by fitting an end portion of a first energy absorber of the at least two of the energy absorbers to an end portion of a second energy absorber of the at least two of the energy absorbers, the end portion of the first energy absorber and the end portion of the second energy absorber facing each other, at least one of the energy absorbers is mountable to a vehicle body structural member, the first energy absorber and second energy absorber are hybrid pipes and the plurality of hollow energy absorbers are disposed between an interior trim member and the vehicle body structure member with the plurality of hollow energy absorbers deforming to absorb energy of an impact load applied in a direction from the interior trim member to the vehicle body structural member.

2. A hollow energy absorber securing structure according to claim 1, wherein the at least two of the energy absorbers, except the end portions to be fitted, have cross sections that differ in at least one of size and shape and the end portion of the first energy absorber is expanded or contracted so that the end portion of the first energy absorber has a sectional shape substantially geometrically similar to a sectional shape of the end portion of the second energy absorber.

3. A hollow energy absorber securing structure according to claim 1, wherein each of the plurality of hollow energy absorbers, other than the first energy absorber and the second energy absorber, is formed by one of a metal pipe and a hybrid pipe, the hybrid pipe, including the hybrid pipe for the first energy absorber and the second energy absorber, having a metal foil core and sheets laid on opposite surfaces of the core, each sheet being formed from a material other than metal, and the hybrid pipe being formed by continually corrugating the core and the sheets on the opposite surfaces of the core together in a direction of an axis of the hybrid pipe.

* * * * *